United States Patent [19]

Guy

[11] Patent Number: 4,995,635
[45] Date of Patent: Feb. 26, 1991

[54] ULTRASONIC DOPPLER VELOCITY SENSING WITHIN A HYDRAULIC ACTUATOR

[75] Inventor: Yoram Guy, Ann Arbor, Mich.

[73] Assignee: Monroe Auto Equipment Company, Monroe, Mich.

[21] Appl. No.: 496,673

[22] Filed: Mar. 21, 1990

[51] Int. Cl.$^5$ ............................................. B60G 17/08
[52] U.S. Cl. ........................................................ 280/707
[58] Field of Search .......................................... 280/707

[56] References Cited

U.S. PATENT DOCUMENTS

| | | | |
|---|---|---|---|
| 496,195 | 3/1990 | Kerastas . | |
| 4,090,407 | 5/1978 | Shuler et al. | 73/290 V |
| 4,550,286 | 10/1985 | Holland et al. | 280/707 |
| 4,595,072 | 6/1986 | Barnea | 280/707 |
| 4,650,042 | 3/1987 | Knecht et al. | 280/707 |
| 4,674,768 | 6/1987 | Morra | 280/702 |
| 4,722,547 | 2/1988 | Kishi et al. | 280/707 |

FOREIGN PATENT DOCUMENTS 87028174 6/1987 Fed. Rep. of Germany .
2177475A 7/1985 United Kingdom .

Primary Examiner—Kenneth R. Rice
Attorney, Agent, or Firm—Harness, Dickey & Pierce

[57] ABSTRACT

A direct acting hydraulic damper comprising an internal, non-contact sensing means for the direct measurement of relative velocity between the piston and the cylinder of the damper. The damper comprising a cylinder forming a working chamber operable to store damping fluid. A piston is disposed within the cylinder defining an upper and lower portion of the working chamber. The damper further comprises a first transducer for emitting ultrasonic waves within the lower portion of the working chamber. The ultrasonic waves emitted by said first transducer are reflected by a base valve or end surface of the cylinder facing the transducers and are received by a second transducer. A frequency detection circuit determines the difference in frequency between the emitted and reflected ultrasonic waves and generates an output in response thereto. A computer then calculates the relative velocity of the piston with respect to the base valve or end surface, based on the Doppler principle. The velocity signal is then used for automatic control of suspension parameters according to predefined algorithm.

27 Claims, 3 Drawing Sheets

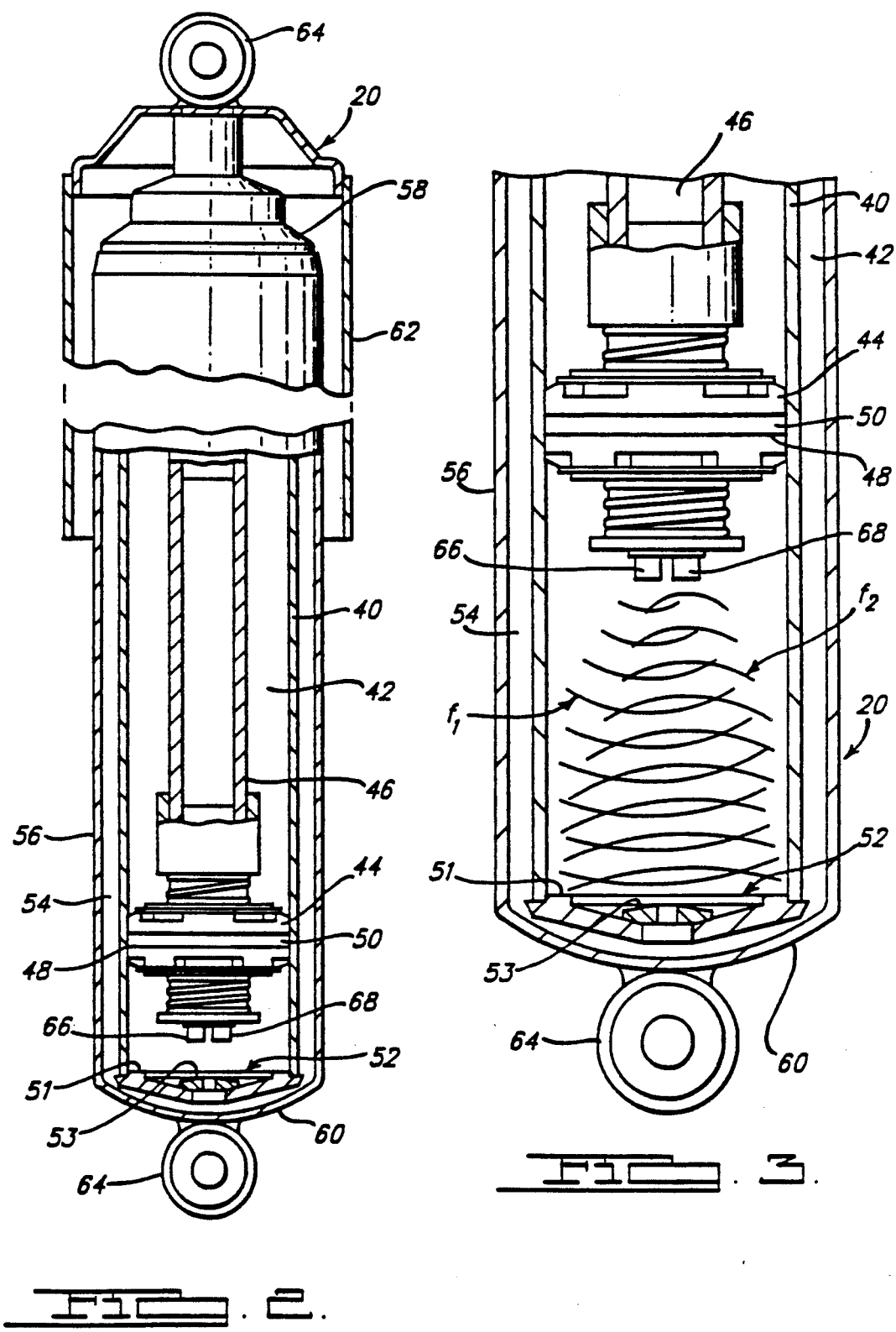

4,995,635

ULTRASONIC DOPPLER VELOCITY SENSING WITHIN A HYDRAULIC ACTUATOR

BACKGROUND OF THE INVENTION

1. Field of the Invention

This invention relates to vehicle suspension systems, and more particularly to a method and apparatus for determining the relative velocity between the telescopically movable components of a hydraulic damping device.

2. Description of Related Art

Damping devices ("dampers") are used in conjunction with automotive suspension systems to absorb unwanted vibration which occurs during driving. To absorb this unwanted vibration, dampers are generally connected between the sprung mass ("body") and the unsprung mass ("wheel") of the automobile. A piston is located within the damper and is connected usually to the body of the automobile through a piston rod. Because the piston valving and orifices act to restrict the flow of damping fluid within the working chamber of the damper when the damper is compressed, the damper is able to produce a damping force which counteracts the motion of the wheel and/or body which would otherwise remain undamped. The greater the degree to which the flow of damping fluid within the working chamber is restricted by the piston, the greater the damping forces which are generated by the damper.

In selecting the amount of damping that a damper is to provide, three vehicle performance characteristics are often considered: ride comfort, vehicle handling and road holding ability. Ride comfort is often a function of the spring constant of the main suspension springs of the vehicle, as well as the spring constant of the seat, tires, and the dampers. Vehicle handling is related, among other things, to variation in the body's attitude (i.e., roll, pitch and yaw). For optimum vehicle handling, relatively large damping forces are required to avoid excessively rapid variation in the body's attitude during cornering, acceleration, and deceleration. Road holding ability is generally a function of the amount of variation in the normal load between the tires and the ground. To optimize road holding ability, larger damping forces are required when driving on irregular surfaces to minimize the normal load variations and to prevent complete loss of contact between the wheels and the ground.

To optimize ride comfort, vehicle handling, and road holding ability, it is generally desirable to have the damping forces generated by the damper be responsive to the frequency of the input from the road or from the body. When the input frequency is approximately equal to a natural frequency of the body (e.g., approximately between 1-2 Hz), it is generally desirable to have the damper provide relatively large damping forces (relative to critical damping) to avoid excessively rapid variation of the vehicle's attitude during cornering, acceleration and deceleration. When the input frequency is between 2-10 Hz mostly from the road, it is generally desirable to have the damper provide low damping levels so as to produce a smooth ride and allow the wheels to follow changes in road elevation. When the input frequency from the road is approximately equal to the natural frequency of the automobile suspension (i.e., approximately 10-15 Hz), it is desirable on one hand to have relatively low damping forces to provide a smooth ride, and on the other hand provide high damping forces so as to minimize variation in tire normal load and prevent complete loss of contact between the wheels and the ground.

Various methods are known for selectively changing the damping characteristics of a damper in response to an input frequency from the road. PCT application No. PCT/US 87/00615 discloses one such method. The apparatus used to perform the method comprises a pressure cylinder forming a working chamber having first and second portions operable to store damping fluid. The apparatus further comprises a first valve for controlling the flow of damping fluid between the first and second portions of the working chamber during compression of the apparatus. In addition, the apparatus also comprises a pressure chamber in fluid communication with the first portion of the working chamber and the first valve. A solenoid is also provided for regulating the flow of damping fluid between the pressure chamber and the second portion of the working chamber. A second valve is further provided for controlling the flow of damping fluid between the first and second portions of the working chamber during rebound of the apparatus.

When such methods are used for changing the damping characteristics of a damper, they often require information regarding the movement of the piston within the pressure cylinder of the damper. This information not only identifies whether the damper is in compression or extension, but also can provide information concerning the magnitude and frequency of suspension motion.

Several methods are known for obtaining information regarding the movement of the piston within the pressure cylinder. PCT application No. PCT/US87/00615 uses a pressure sensor as well as an accelerometer to determine whether the damper is in compression or extension, as well as to obtain information regarding the road surface. U.K. Pat. application No. GB 2 177 475A and West German Pat. No. G 87 02 817.4 disclose suspension damping devices incorporating ultrasonic wave systems for determining positional displacement information. The positional displacement information is obtained by determining the time from transmission of an ultrasonic wave to when its reflected "echo" wave is received. Both references use a single transducer acting to emit and receive the pulsed ultrasonic waves. Use of a single transducer necessitates incorporation of costly ultrsonic wave modulation and calibration circuitry to ensure coherent wave detection. Additionally, the transducers in both references are mounted such that the piston acts to reflect the ultrasonic waves.

SUMMARY OF THE INVENTION

Accordingly, it is a primary object of the present invention to provide a method for sensing the relative velocity between the telescopically movable components of a hydraulic actuator ("damper") so as to permit selective control over the damping, motion, position and/or forces generated by the actuator.

Another primary object of the present invention is to provide a hydraulic damper or actuator capable of providing selective damping which incorporates a method for calculating the relative velocity of a telescopically movable piston within a pressure cylinder using acoustical Doppler principles.

Another object of the present invention is to provide a method and apparatus for generating continuous realtime electrical signals for selectively controlling suspension characteristics.

It is a further object of the present invention to provide a method and apparatus for selectively controlling characteristics of a damper in response to changes in the frequency of acoustical waves, preferably within the ultrasonic spectrum, changes which are responsive to the relative velocity between the sprung and the unsprung portions of a vehicle.

A further object of the present invention is to provide a direct acting, telescopic, hydraulic damper having a high degree of flexibility with respect to vehicular applications. In this regard, a related object of the present invention is to provide a non-contact velocity sensing apparatus which is integrated and packaged within the damper allowing universal applicability to widely differing suspension configurations and sizes.

According to the preferred embodiment of the present invention, the hydraulic actuator comprises a direct acting hydraulic damper having first electromechanical transducer means ("transmitter") for emitting sound waves and second electromechanical transducer means ("receiver") for receiving sound waves. The transmitter and receiver are mounted to the piston, which is coaxially disposed within the pressure cylinder of the damper, on the surface of the piston opposite to that facing the rod. Electrical leads passing through the piston rod and piston connect the individual transducers to signal generating and processing circuitry.

According to the method of the present invention, a wave generating circuit excites the transmitter so as to produce a constant frequency ultrasonic wave. The transmitter emits ultrasonic waves of a predefined frequency and duration through the damping fluid medium located between the surface of the piston and the end wall or base valve disposed at the end of the pressure cylinder facing the transmitter and receiver. The emitted ultrasonic waves are reflected by an end wall or a base valve at the end of the cylinder so as to propagate back to the receiver through the damping fluid. The receiver electrically communicates with a frequency detection circuit which detects the frequency of the reflected ultrasonic waves. Additionally, the wave generating circuit electrically communicates with the frequency detection circuit so as to provide an indication of the frequency of the ultrasonic waves emitted by the transmitter.

By using the difference in frequency between the emitted ultrasonic waves and the reflected ultrasonic waves, the relative velocity of the piston with respect to the cylinder end can be calculated based on the Doppler principle, as discussed below, by using a computer. Accordingly, a continuous relative velocity determination can therefore be generated which is used by a piston control circuit to control the damping forces of the damper. Relative velocity determination can also be employed to detect the polarity (direction) of motion of the piston.

While the preferred embodiment discloses a twin-tube damper, it is contemplated that the present invention is readily adapted to mono-tubes, struts, and other hydraulic actuators having vehicular application.

BRIEF DESCRIPTION OF THE DRAWINGS

Various advantages of the present invention will become apparent to one skilled in the art upon reading the following specification and by reference to the following drawings in which:

FIG. 2 is an enlarged side elevational view, partially broken away, of the direct acting hydraulic damper shown in FIG. 1 according to a preferred embodiment of the present invention;

FIG. 3 is an enlarged cross-sectional view of FIG. 2 illustrating the relative location and operation of the ultrasonic transducer devices shown in FIG. 2 according to a preferred embodiment of the present invention.

DESCRIPTION OF THE PREFERRED EMBODIMENT

Figure 1:
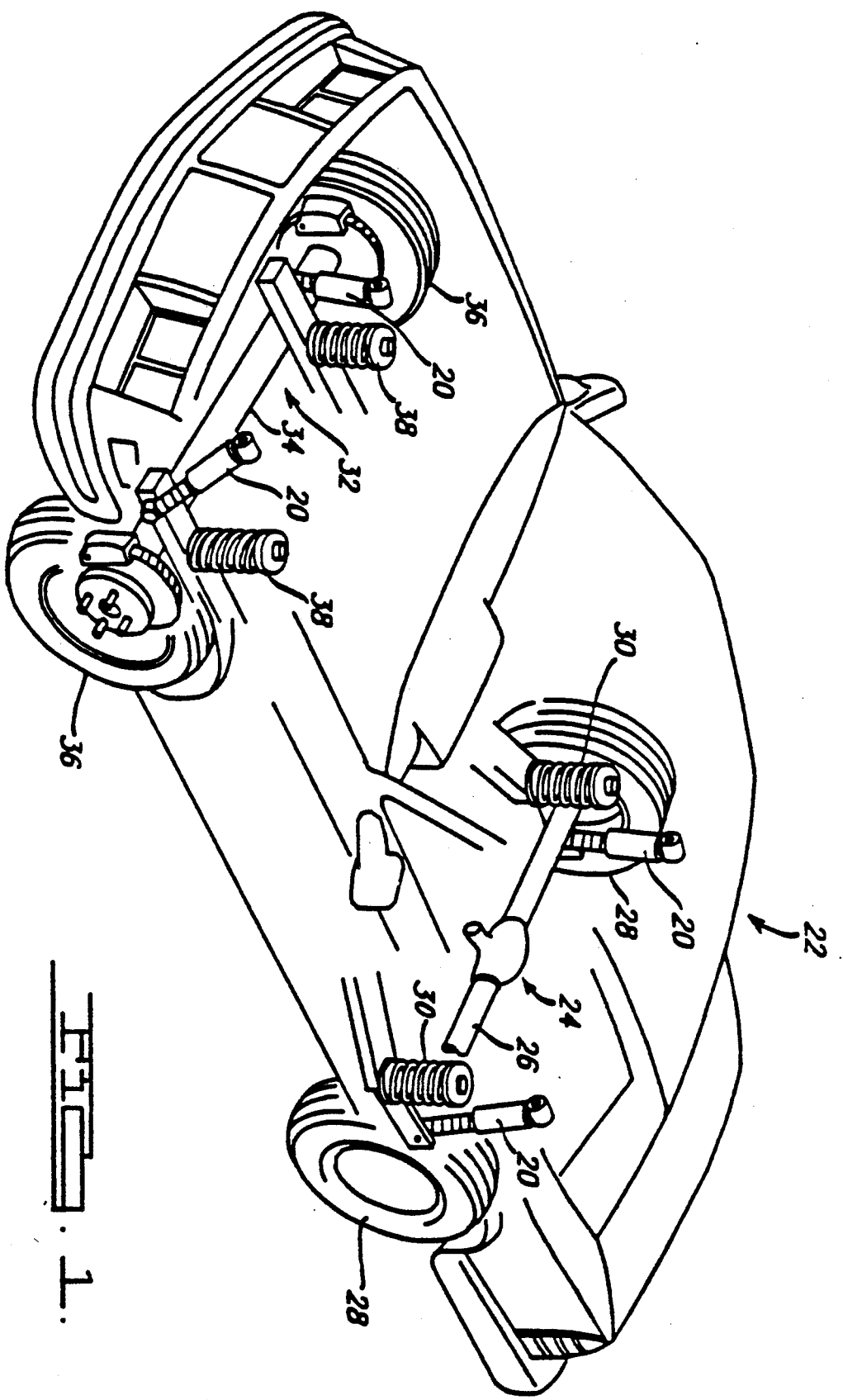
FIG. 1 is a diagrammatic representation of the direct acting hydraulic dampers according to the preferred embodiment of the present invention shown in operative association with a typical automobile.

Referring to FIG. 1, a plurality of four hydraulic actuators defined as dampers 20 in accordance with the preferred embodiment of the present invention are shown. The dampers 20 are depicted in operative association with a diagrammatic representation of a conventional automobile 22. The automobile 22 includes a rear suspension 24 having a transversely extending rear wheel assembly 26 adapted to support the rear wheels 28 of the automobile 22. The wheel assembly 26 is operably connected to the automobile 22 by means of a pair of dampers 20 as well as by the helical coil springs 30. Similarly, the automobile 22 has a front suspension system 32 including a transversely extending front wheel assembly 34 to support the front wheels 36. The front wheel assembly 34 is connected to the automobile 22 by means of a second pair of the dampers 20 and by the helical coil springs 38. The dampers 20 serve to damp the relative movement of the unsprung portions (i.e., the front and rear suspension 32 and 24) and the sprung portion (i.e., the body 39) of the automobile 22. While the automobile 22 has been depicted as a passenger car, the dampers 20 may be used with other types of automotive vehicles as well.

With particular reference to FIG. 2, the damper 20 according to the preferred embodiment of the present invention is shown. The damper 20 comprises an elongated tubular pressure cylinder 40 defining a damping fluid containing working chamber 42. Disposed within the working chamber 42 is a reciprocable piston 44 that is secured to one end of an axially extending piston rod 46. The piston 44 includes a circumferential groove 48 operable to retain a piston ring 50 as is well known in the art. The piston ring 50 is used to prevent damping fluid from flowing between the outer periphery of the piston 44 and the inner diameter of the cylinder 40 during movement of the piston 44. A base valve, generally designated by the numeral 52, is located within the lower end of the pressure cylinder 40 and is used to control the flow of damping fluid between the working chamber 42 and an annular fluid reservoir 54. The annular fluid reservoir 54 is defined as the space between the outer periphery of the cylinder 40 and the inner periphery of a reservoir tube or cylinder 56 which is arranged centrally around the exterior of the pressure cylinder 40. The operation of the base valve 52 may be of the type shown and described in U.S. Pat. No. 3,771,626 which is hereby incorporated by reference. Additionally, the base valve 52 has a step-like upper geometry defining a first surface 51 and a second surface 53 to be detailed hereinafter. It is contemplated, however, that the present invention is applicable to hydraulic actuator operable without base valves, check valve or the like.

The upper and lower ends of the dampers 20 are provided with generally cup-shape upper and lower end caps 58 and 60 respectively. The end caps 58 and 60 are secured to opposing ends of the reservoir tube 56 by a suitable means such as welding. The dampers 20 are shown as being provided with a dirt shield 62 which is secured at its upper end to the upper end of the piston rod 46. Suitable end fittings 64 are secured to the upper end of the piston rod 46 and the lower end cap 60 for securing the dampers 20 between the body and the wheel assembly of the automobile 22. Those skilled in the art will appreciate that, upon reciprocal movement of the piston 44, damping fluid within the pressured cylinder 40 is transferred between the upper and lower portions of the working chamber 42, and between the working chamber 42 and the fluid reservoir 54. By controlling the flow of damping fluid between the upper and lower portions of the working chamber 42, the dampers 20 are able to controllably dampen relative movement between the body and the wheel of the automobile 22.

The piston 44 is provided with a valve arrangement (not shown) for controllably metering the flow of damping fluid between the upper and lower portions of the working chamber 42 during reciprocal movement thereof. One such valve arrangement is disclosed in PCT application No. PCT/US87/00615 which is hereby incorporated by reference. It is contemplated, however, that the present invention may be used with other suitable valve arrangements as well as other suitable damping devices.

In accordance with the principles of the present invention, the damper 20 further comprises an acoustical transmitter 66 and a receiver 68, both of which are secured to the surface of the piston 44 opposite rod 46. The transmitter 66 is used to generate ultrasonic waves having a predetermined frequency $f_1$ in the direction of the end wall of cylinder 40 facing the transmitter and receiver and to which base valve 52 is secured. While the transmitter 66 may be a piezoelectric or magnetorestrictive device, other suitable devices may be used. When the ultrasonic waves emitted by the transmitter 66 encounter the base valve 52, they are reflected in a direction toward the receiver 68. The receiver 68 is used to receive the ultrasonic waves of frequency $f_2$ which are reflected by the base valve 52 and generate an output in response thereto. While the receiver 68 may be a piezoelectric or magnetorestrictive device, other suitable devices may be used. For purposes of the following discussion, the ultrasonic waves generated by the transmitter 66 will be referred to as the emitted ultrasonic waves, while the ultrasonic waves reflected by the base valve 52 to the receiver 68 will be referred to as the reflected ultrasonic waves.

Base valve 52 is provided with a first stepped surface 51 axially displaced above second stepped surface 53 perpendicular to the cylindrical axis of cylinder 40 by a predefined distance. This predefined axial displacement of stepped surfaces 51 and 53 provide means for compensating for changes in the speed of wave propagation through the damping fluid due to the temperature and pressure effects on fluid viscosity. The stepped surfaces 51 and 53 produce a separate reflected wave and echo wave, respectively, which are both received by receiver 68. The echo wave lags behind the reflected wave and is received by receiver 68 after receipt of the reflected wave. The relationship between the predefined axial distance and the time between receipt of the reflected wave and the echo wave permits adjustments for fluid vicosity changes. Further, while the preferred embodiment discloses a twin tube structure having a base valve, it is contemplated that any hydraulic damper provided with a stepped end-plate or stepped end-surface aligned in facing relationship to transmitter 66 and receiver 68 is within the scope of this invention.

When the piston 44 is stationary with respect to the base valve 52, the reflected ultrasonic waves will have the same frequency as the emitted ultrasonic waves. However, when the piston 44 is moving in a direction toward the cylinder end to which the base valve 52 is secured, the frequency of the reflected ultrasonic waves will be higher than the frequency of the emitted ultrasonic waves. In contrast, when the piston 44 is moving in a direction away from the cylinder end to which the base valve 52 is located, the reflected ultrasonic waves will have a lower frequency than that of the emitted ultrasonic waves. This phenomenon is referred to as the Doppler Effect.

By using the Doppler Effect, the relative velocity of the piston 44 in respect to a facing distal end surface of the cylinder 40, such as that provided by base valve 52, may be determined. In this regard, the velocity of the piston 44 relative to the end surface of the pressure cylinder 40 may be calculated according to either of the following equations:

$$\frac{f_2}{f_1} = 1 + \frac{v}{c} \quad (1)$$

$$\frac{f_b}{f_1} = \frac{v}{c} \quad (2)$$

where:

$f_1$ = frequency of the emitted ultrasonic waves generated by the transmitter 66.

$f_2$ = frequency of the reflected ultrasonic waves received by the receiver 68.

$f_b$ = "beating frequency" defined as $f_2-f_1$p1 v = relative velocity of the piston 44 with respect to a cylinder 40 end surface (base valve 52)..

c = velocity of wave propagation through the damping fluid.

The velocity of wave propagation of the ultrasonic waves through the working chamber 42 is largely dependent on the characteristics of damping medium through which the waves propagate. While the preferred embodiment of the present invention uses hydraulic damping fluid as the damping medium, it is contemplated that the present invention can be readily adaptable to other suitable fluids as well.

To provide means for driving the transmitter 66, a wave generating circuit 72 is provided. The wave generating circuit 72 is electrically connected to the transmitter 66 so as to enable the transmitter 66 to produce emitted ultrasonic waves of a predetermined frequency $f_1$. Preferably, the wave generating circuit 72 causes the emitted ultrasonic waves generated by the transmitter 66 to be of continuous form so as to enable efficient, continuous, real-time determinations of the relative velocity between the piston 44 and the base valve 52. While the wave generating circuit 72 may be an oscillator, other types of wave generating circuits such as pulse wave generators may be used.

Figure 4:
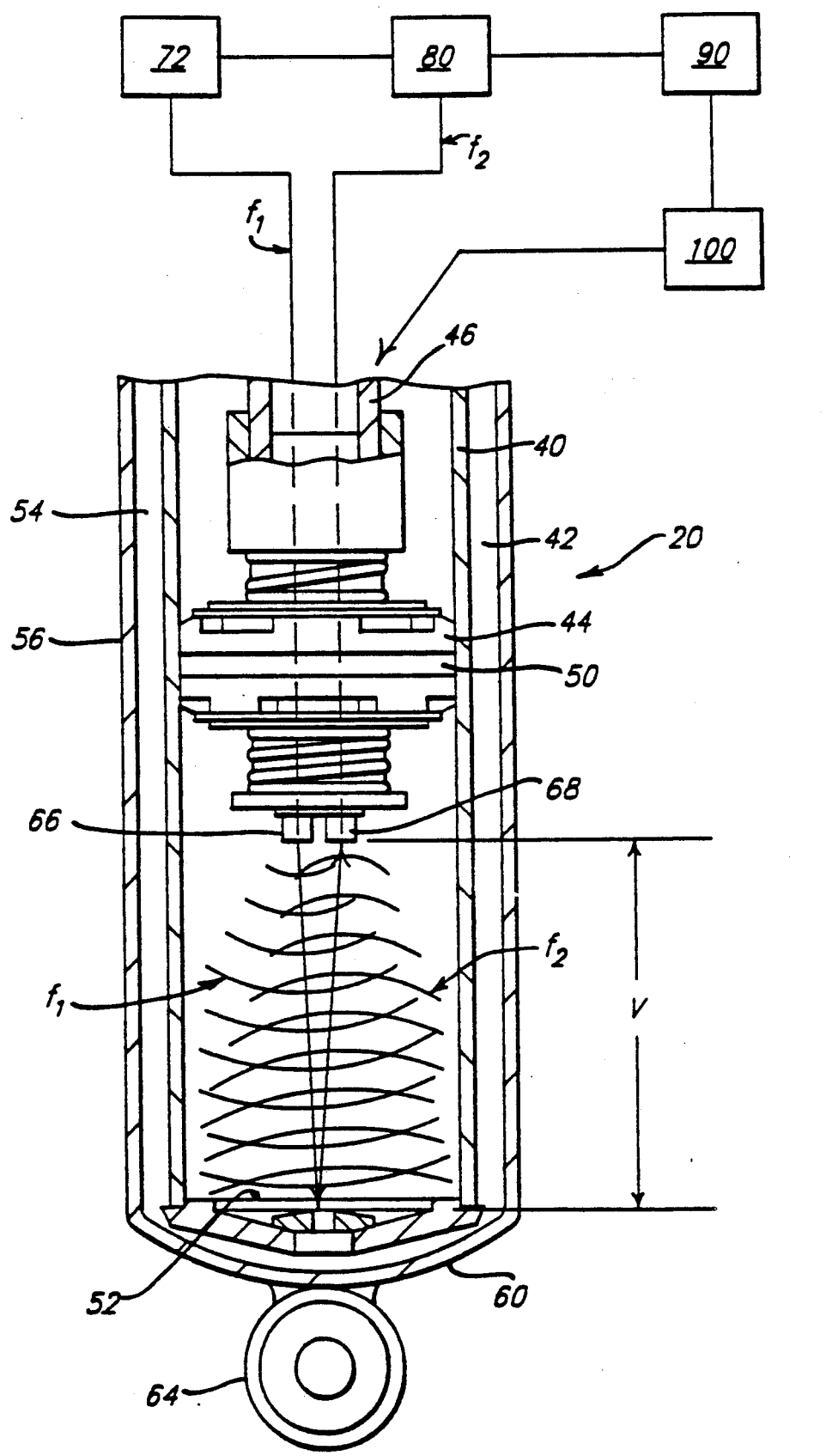
FIG. 4 is a block diagram illustrating the electrical components which are used for driving the transducers shown in FIG. 2 as well as for changing the damping characteristics of the damper.

To provide means for measuring the change in frequency between the reflected ultrasonic waves and the emitted ultrasonic waves, the damper 20 further comprises a frequency detection circuit 80. As shown in FIG. 4, the frequency detection circuit 80 receives the output from the wave generating circuit 72 as well as the receiver 68. The frequency detection circuit 80 determines the change in frequency by adding or "superimposing" the outputs from the wave generating circuit 72 and the receiver 68. Superimposition of the outputs corresponding to the emitted ultrasonic waves and the reflected ultrasonic waves is a frequency detection method commonly utilized in Doppler radar systems. As shown in equation (2), the superimposed "beat" frequency $f_b$ is linearly proportional to the piston relative velocity v, so as to permit continuous detection of changes in the relative motion of the cylinder 40 with respect to the piston 44. It is to be understood, however, that other suitable means for measuring the difference between the frequency of the reflected ultrasonic waves and the emitted ultrasonic waves may be used.

Upon determination of the "beat" frequency, the relative velocity of the piston 44 with respect to the base valve 52 is calculated in the manner discussed above. To provide means for calculating the relative velocity between the piston 44 and the cylinder 40, an electronic processor ("computer") 90 is used. According to the embodiment disclosed, the computer 90 uses the output from the frequency detection circuit 80 to determine the relative velocity of the piston 44 with respect to the base valve 52. After the relative velocity of the piston 44 with respect to the base valve 52 has been determined by the computer 90, the computer 90 generates an output in response to the velocity calculation which may be used in various suspension control algorithms requiring relative velocity input. One such control scheme is to deliver the velocity calculation to a piston control circuit 100. The piston control circuit 100 then acts to change the damping characteristics of the piston valving to obtain the desired road handling characteristics. However, it is contemplated that relative velocity determinations can be employed to provide positional, directional and/or force information applicable to controlling active or dynamic leveling actuators instead of, or in addition to, damping control.

The present invention includes means for adjusting the relative velocity determination "v" to compensate for frequency changes due to the temperature and viscosity of the damping medium. Such adjustment involves the periodic calculation of the current value of the wave propagation velocity "c" using the echo wave and the reflected wave generated by the stepped surfaces previously mentioned.

While it is apparent that the preferred embodiment illustrated herein is well calculated to fill the objects stated above, it will be appreciated that the present invention is susceptible to modification, variation and change without departing from the scope of the invention. For example, it is contemplated that the frequency detection circuit 80, the computer 90 and wave generating circuit 70 may all be located either internal or external with respect to the damper. If located externally of the dampers 20, a single computer 90 may be used to calculate the relative velocity and control any suspension parameter (leveling, damping, springing, etc.) for each of the dampers in the vehicle suspension.

However, it is contemplated that other means of compensating for frequency changed due to the temperature and viscosity effects on the damping fluid are within the scope of this invention. Such alternative compensation methods may include sensing temperature changes of the fluid for estimating frequency changes based upon known characteristics of the damping fluid.

What is claimed is:

1. A hydraulic actuator connecting the sprung and unsprung portions of a vehicle, said hydraulic actuator operable to measure changes in the relative velocity between the telescopically movable components thereof, said hydraulic actuator comprising:
    a cylinder forming a working chamber operable to store damping fluid;
    a piston disposed within said cylinder defining a first and a second portion of said working chamber, said piston being movable within said cylinder;
    first transducer means for emitting sound waves through damping fluid contained within said second portion of said working chamber;
    means for driving said first transducer means so as to cause said first transducer means to emit sound waves;
    means for reflecting the sound waves emitted by said first transducer means, said reflecting means being disposed within said cylinder;
    second transducer means for receiving sound waves reflected by said reflecting means;
    measuring means for determining the change in frequency between the sound waves received by said second transducer means and the sound waves emitted by said first transducer means and generating an output in response thereto; and
    means for calculating the relative velocity of said piston within said cylinder in response to said output from said measuring means.

2. The hydraulic actutator according to claim 1 further comprising a control circuit and logic operable to selectively change at least one suspension parameter in response to the relative movement of said piston within said cylinder.

3. The hydraulic actuator according to claim 1, wherein said actuator is a hydraulic direct acting, telescopic damper.

4. The hydraulic actuator according to claim 1, wherein the frequency of the sound waves emitted by said first transducer means reside within the ultrasonic spectrum.

5. The hydraulic actuator according to claim 4, wherein said driving means comprises a wave generating circuit operable to cause said first transducer means to generate ultrasonic waves.

6. The hydraulic actuator according to claim 5, wherein said wave generation circuit enables said first transducer means to generate ultrasonic waves having a fixed controlled frequency and duration.

7. The hydraulic actuator according to claim 6, wherein said first transducer means comprises a transmitter mounted to a surface of said piston opposite a piston rod and being operable to propagate ultrasonic waves through said damping fluid contained in said second portion of said working chamber.

8. The hydraulic actuator according to claim 7, wherein said second transducer means comprises a receiver mounted to said piston adjacent to said transmitter.

9. The hydraulic actuator according to claim 8, wherein said transmitter and said receiver comprise piezoelectric transducers.

10. The hydraulic actuator according to claim 8, wherein said transmitter and said receiver comprise magnetorestrictive transducers.

11. The hydraulic actuator according to claim 7, wherein said reflecting means comprises a base valve secured to an end surface of said cylinder facing said transmitter and receiver.

12. The hydraulic actuator according to claim 11, wherein said base valve further comprises means for compensating for changes in the speed of propagation of said sound waves.

13. The hydraulic actuator according to claim 7, wherein said reflecting means comprises a end surface of said cylinder facing said transmitter and receiver.

14. The hydraulic actuator according to claim 1, wherein said measuring means comprises a frequency detection circuit operable to continuously generate an output in response to changes in frequency between the sound waves received by said second transducer means and the sound waves emitted by said first transducer means.

15. The hydraulic actuator according to claim 1, wherein said means for calculating the relative movement of said piston comprises an electronic processor such as a computer.

16. A method of determining the relative movement of a piston within a pressure cylinder of a damper, said method comprising the steps of:
delivering an electrical signal generated by a wave generation circuit to an ultrasonic transmitter, said ultrasonic transmitter operable to emit ultrasonic waves of fixed and controlled frequency in response to said electrical signal generated by said wave generation signal;
reflecting said ultrasonic waves emitted by said ultrasonic transmitter against a fixed inner surface of said pressure cylinder;
receiving said ultrasonic waves reflected by said fixed inner surface by an ultrasonic receiver positioned adjacent to said ultrasonic transmitter;
providing measuring means for comparing the frequency of said ultrasonic waves received by said ultrasonic receiver and the frequency of said ultrasonic waves emitted by said ultrasonic transmitter and generating an output signal in response thereto;
calculating the relative movement between said piston and said fixed inner surface in response to said output signal from said measuring means; and
selectively changing a suspension parameter in response to said relative movement between said piston and said fixed inner surface.

17. The method of claim 16, wherein said piston has a first surface facing said fixed inner surface of said pressure cylinder, said ultrasonic transmitter being mounted to said first surface of said piston.

18. The method of claim 16, wherein said step of comparing the frequency of said ultrasonic waves received by said ultrasonic receiver and the frequency of said ultrasonic waves emitted by said ultrasonic transmitter comprises delivering said outputs from said ultrasonic receiver and said wave generation circuit to a frequency detection circuit, said frequency detection circuit operable to continuously determine changes in frequency of said ultrasonic waves received by said ultrasonic receiver with respect to said ultrasonic waves emitted by said ultrasonic transmitter and generate said output signal in response thereto.

19. The method of claim 16, wherein said step of calculating said relative movement between said piston and said fixed inner surface comprises delivering said output signal from said frequency detection circuit to a computer, said computer calculating said relative movement from said output.

20. The method of claim 19, wherein said computer determines the relative movement between said piston and said fixed inner surface of said pressure cylinder according to either of the following equations:

$$\frac{f_2}{f_1} = 1 + \frac{v}{c} \quad (1)$$

$$\frac{f_b}{f_1} = \frac{v}{c} \quad (2)$$

where
$f_1$ = frequency of said ultrasonic waves emitted by said ultrasonic transmitter;
$f_2$ = frequency of said ultrasonic waves received by said ultrasonic receiver;
$f_b$ = "beating frequency" defines as $f_2-f_1$;
v = relative velocity between said piston and said fixed member;
c = speed of propagation of said ultrasonic waves through said damping fluid.

21. A direct acting hydraulic damper operable to selectively vary a suspension characteristic thereof in response to the relative velocity between a piston and a cylinder end surface, said damper comprising:
a pressure cylinder forming a working chamber operable to store damping fluid;
a piston disposed within said pressure cylinder defining a first and second portion of said working chamber, said piston being movable with respect to said pressure cylinder and comprising valve means for metering the flow of damping fluid between said first and second portions of said working chamber during movement of said piston within said pressure cylinder;
first transducer means for emitting and axially transmitting sound waves through said damping fluid contained within said second portion of said working chamber, said first transducer means being mounted to a surface of said piston facing said second portion;
means for driving said first transducer means;
an end surface of said second portion of said working chamber, said end surface operable to reflect sound waves emitted by said first transducer means, said end surface having means for compensating for variations in the speed of propagation of said sound waves through said damping fluid;
second transducer means for receiving the sound waves reflected by said end surface, said second transducer means being mounted on a piston surface adjacent to said first transducer means;
a frequency detection circuit for measuring the difference in frequency of said sound waves emitted by said first transducer means and said sound waves received by said second transducer means and generating an output in response thereto;
a processor for calculating the relative velocity of said piston relative to said end surface from said output of said frequency detection circuit; and a control circuit for selectively controlling said desired suspension characteristic in response to the velocity of said piston relative to said end surface.

22. The direct acting hydraulic damper according to claim 21, wherein said sound waves emitted by said first transducer means and said sound waves received by said second transducer means reside within the ultrasonic spectrum.

23. The direct acting hydraulic damper according to claim 22, wherein said means for driving said first transducer means comprises a wave generation circuit, said wave generation circuit operable to cause said first transducer means to generate constant frequency ultrasonic waves.

24. The direct acting hydraulic damper according to claim 22, wherein said first and second transducer means comprise piezoelectric devices.

25. The direct acting hydraulic damper according to claim 22, wherein said first and second transducer means comprise magnetorestrictive devices.

26. The direct acting hydraulic damper according to claim 22, wherein said frequency detection circuit continuously generates an output in response to changes in the frequency of said second transducer means.

27. The direct acting hydraulic damper according to claim 21, wherein said compensation means associated with said end surface comprises a step-like end surface configuration having first and second reflecting surface, said first and second axially displaced reflecting surfaces separated by a predetermined axial distance such that said transducer means receives sound waves reflected by said first and second reflecting surfaces so as to define a reference signal.

* * * * *